United States Patent [19]

Rogers

[11] Patent Number: 4,764,939

[45] Date of Patent: Aug. 16, 1988

[54] CABLE SYSTEM FOR DIGITAL INFORMATION

[75] Inventor: William P. Rogers, Collingswood, N.J.

[73] Assignee: Telenex Corporation, Collingswood, N.J.

[21] Appl. No.: 88,476

[22] Filed: Aug. 19, 1987

Related U.S. Application Data

[63] Continuation of Ser. No. 803,894, Dec. 2, 1985, abandoned.

[51] Int. Cl.⁴ .......................................... H04L 27/00
[52] U.S. Cl. ........................................ 375/37; 375/36; 370/29
[58] Field of Search .................. 375/25, 36, 37; 455/2; 358/84, 86; 370/24, 29, 77; 361/392, 393, 394, 395; 339/17 LC, 17 R

[56] References Cited

U.S. PATENT DOCUMENTS

| | | | |
|---|---|---|---|
| 2,424,977 | 8/1947 | Grieg | 179/15 |
| 3,124,652 | 3/1964 | Biagi et al. | 179/15 |
| 3,178,515 | 4/1965 | Bramer et al. | 179/15 |
| 3,311,706 | 3/1967 | Brightman | 179/15 |
| 3,588,615 | 6/1971 | Brearly | 361/394 |
| 3,591,722 | 7/1971 | Palsa | 179/2 |
| 3,660,606 | 5/1972 | De Witt | 179/15 BA |
| 3,665,405 | 5/1972 | Sanders et al. | 340/172.5 |
| 3,676,746 | 7/1972 | Kassabgi et al. | 339/17 LC |
| 3,700,820 | 10/1972 | Blasbalg | 179/15 BV |
| 3,723,658 | 3/1973 | Huebner et al. | 179/15 R |
| 3,772,656 | 11/1973 | Serracchioli et al. | 364/200 |
| 3,827,026 | 7/1974 | Viswanathan | 340/167 A |
| 3,840,705 | 10/1974 | Haskett | 179/15 A |
| 3,855,419 | 12/1974 | Hurford | 179/15 AW |
| 3,932,698 | 1/1976 | Yanagimachi | 179/15 |
| 3,959,595 | 5/1976 | Smith | 179/15 BA |
| 3,985,961 | 10/1976 | Voss et al. | 179/15 AF |
| 4,061,975 | 12/1977 | Sugai | 325/322 |
| 4,097,695 | 6/1978 | Grace et al. | 179/15 |
| 4,310,922 | 1/1982 | Lichtenberger | 370/48 |
| 4,366,478 | 12/1982 | Masuda et al. | 340/825 |
| 4,385,377 | 5/1983 | Norris et al. | 370/10 |
| 4,397,030 | 8/1983 | Becker et al. | 375/36 |
| 4,412,349 | 10/1983 | Wright | 375/36 |
| 4,546,382 | 10/1985 | McKenna et al. | 455/2 |
| 4,603,320 | 7/1986 | Farago | 340/347 DD |

*Primary Examiner*—Robert L. Griffin
*Assistant Examiner*—Stephen Chin
*Attorney, Agent, or Firm*—Albert L. Free

[57] ABSTRACT

A cable system for supplying information contained in a plurality of parallel signals on a first set of plug contacts of a first plug at a modem, to a second set of plug contacts of a second plug at a CPU, a remote terminal or the like, without requiring use of a large, expensive multiwire cable containing a wire for each signal. The cable system comprises a transmission line and two connector plug assemblies connected to opposite ends of the transmission line, one of the plug assemblies being adapted to mate with the plug contacts of the plug at the modem and the other to mate with the plug contacts at the CPU or remote terminal. Each plug assembly contains a parallel-to-serial converter and a serial-to-parallel converter; each parallel-to-serial converter samples the parallel signals at its associated plug to produce, on a corresponding twisted pair of wires in the cable, time-multiplexed serial signal representing the parallel signals, and each serial-to-parallel converter converts its received serial signal back to parallel and applies it to its associated plug contacts. Two twisted-pair lines are then sufficient to transmit a large number of signals in both directions.

9 Claims, 9 Drawing Sheets

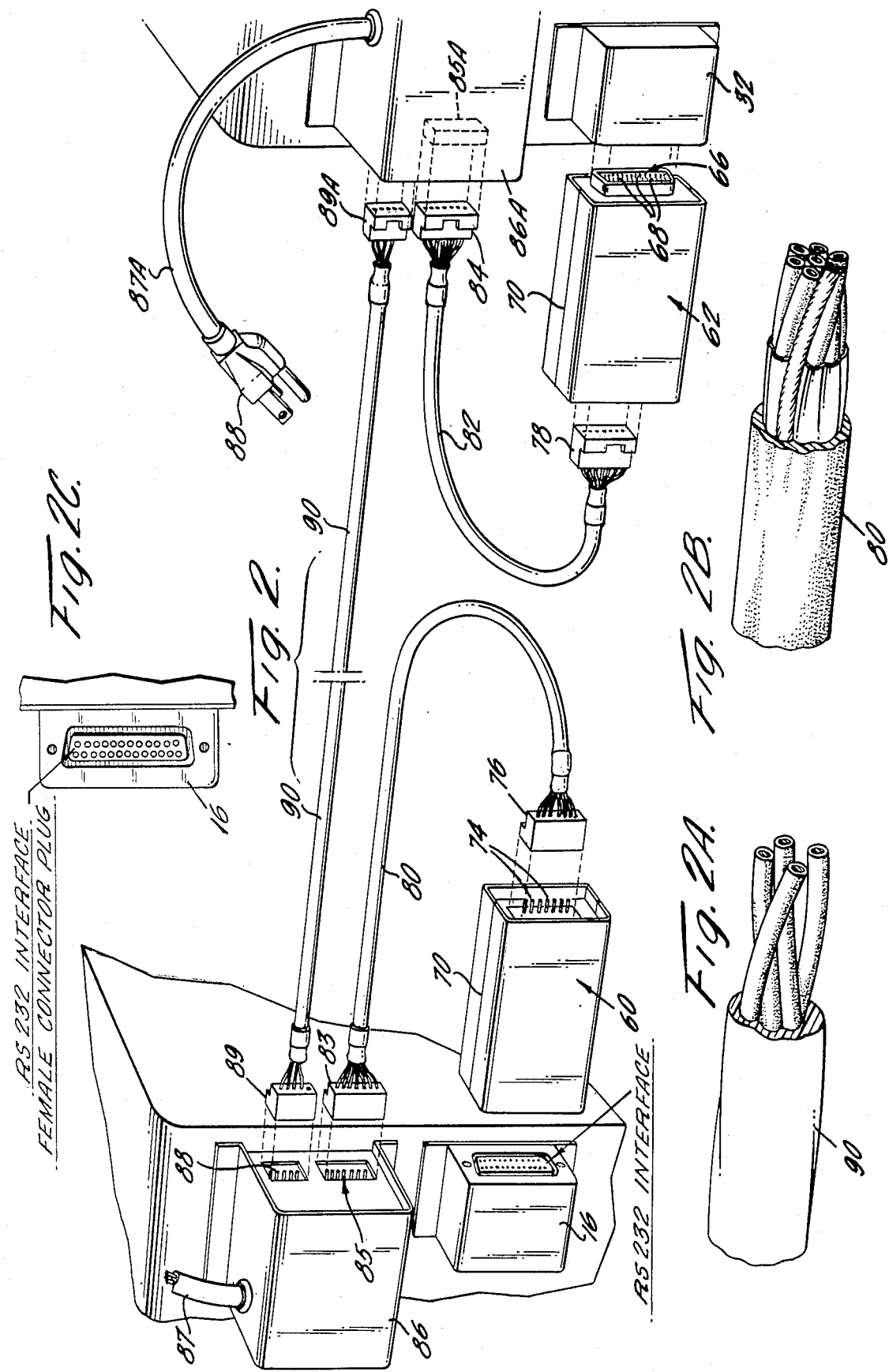

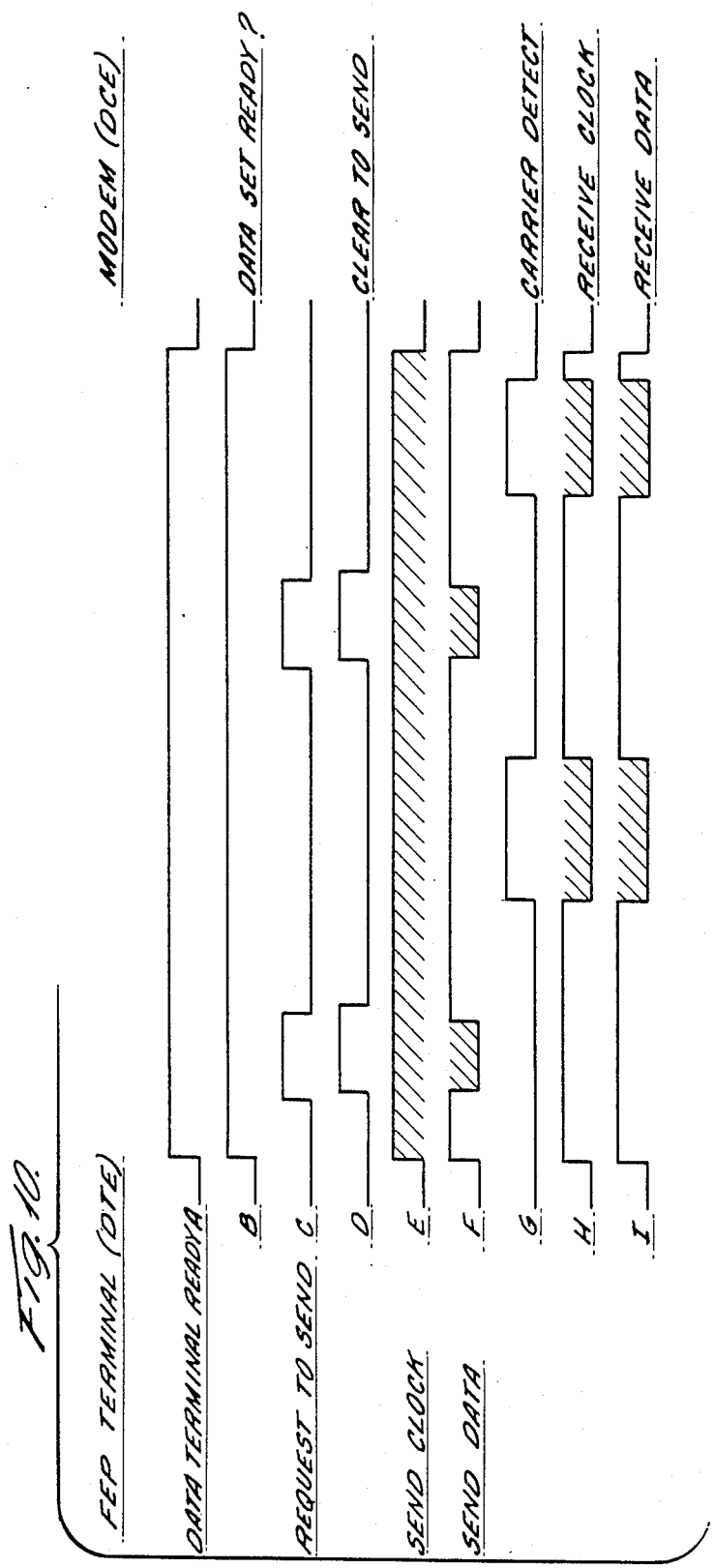
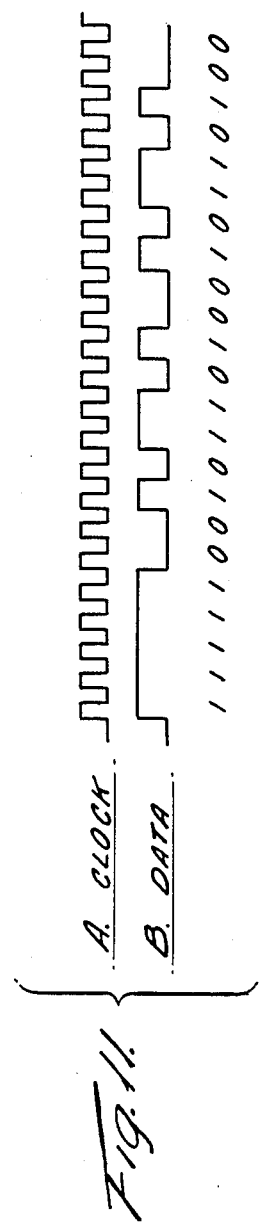

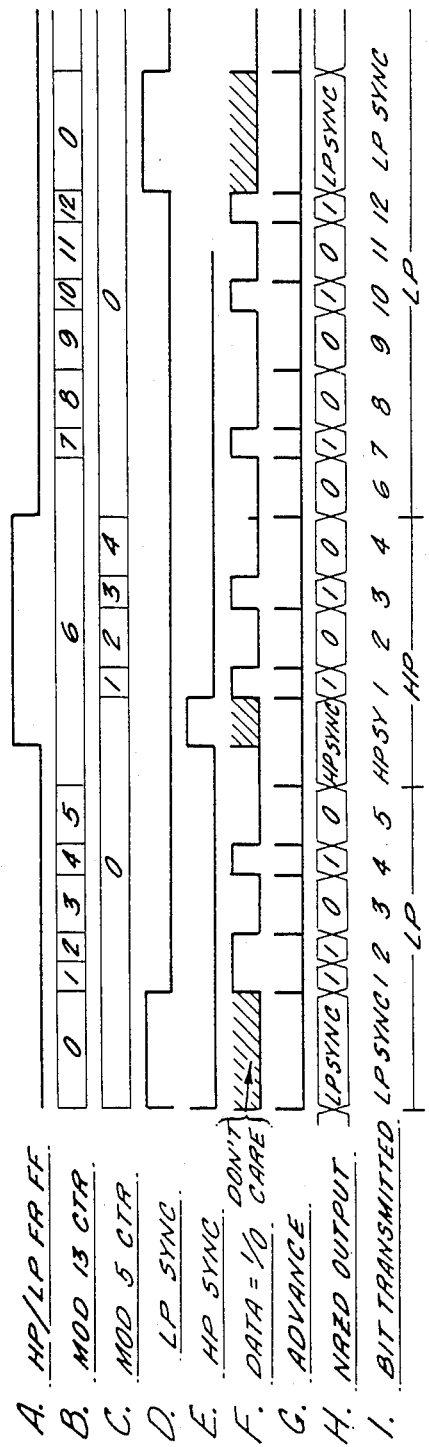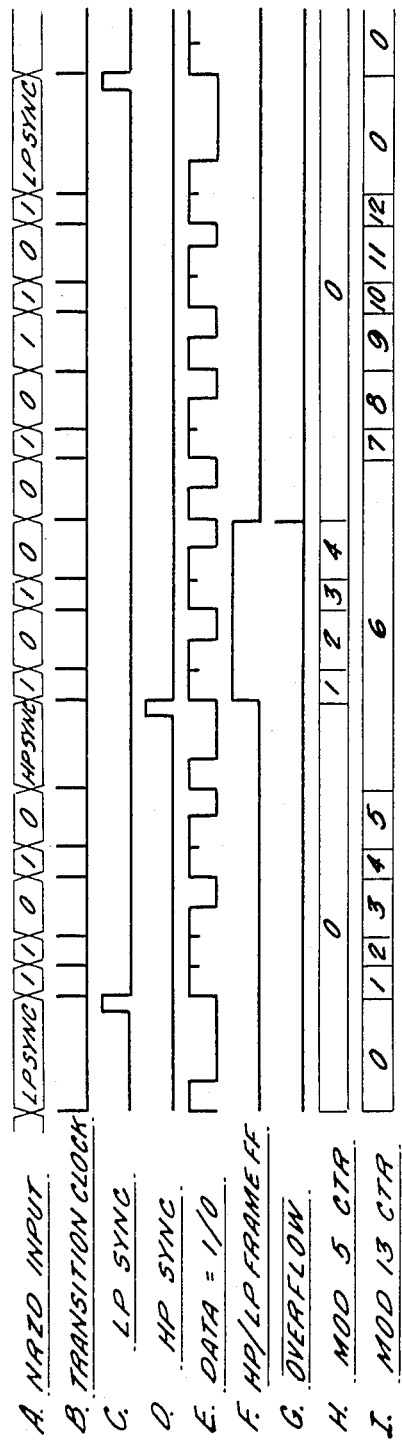

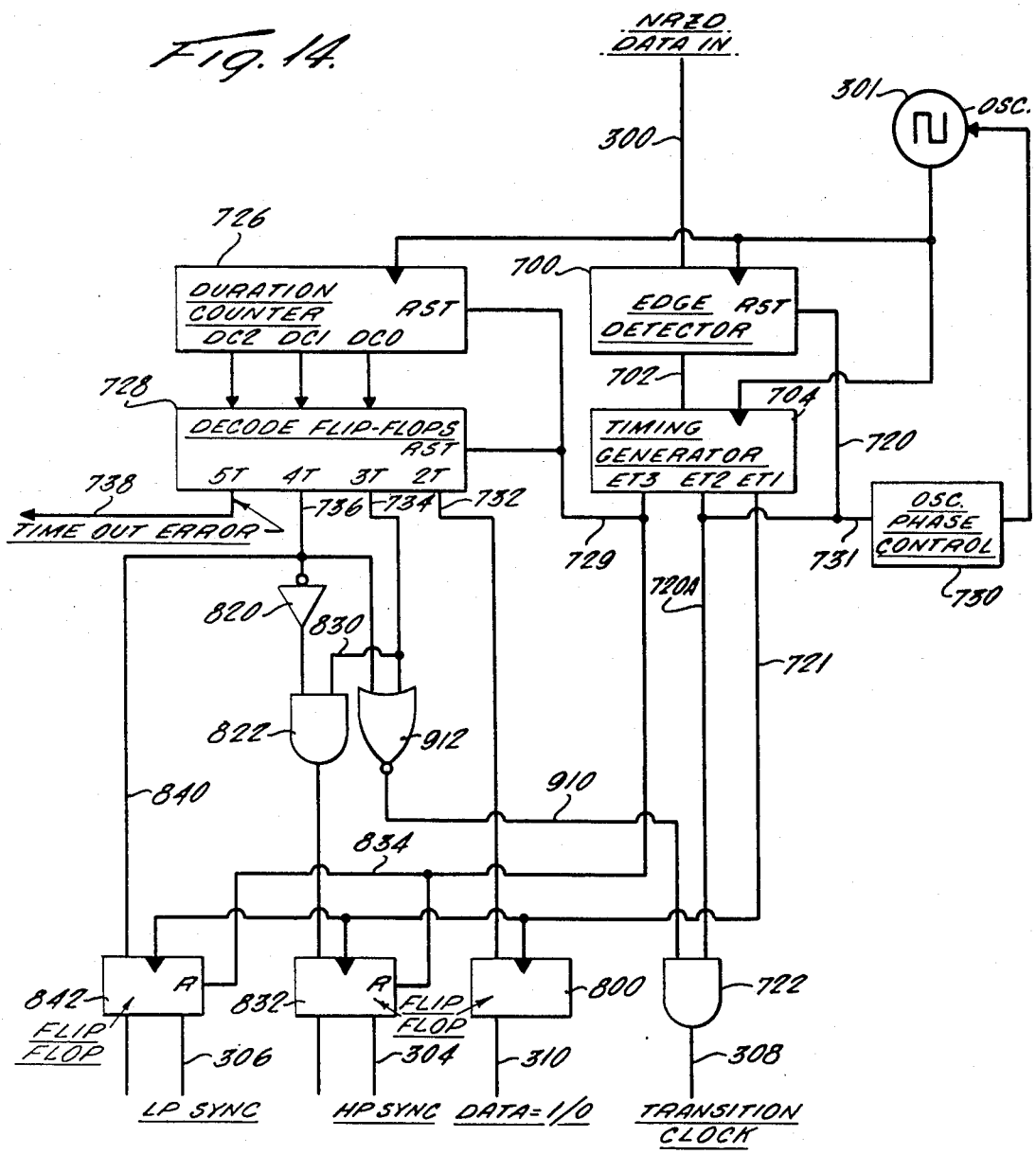

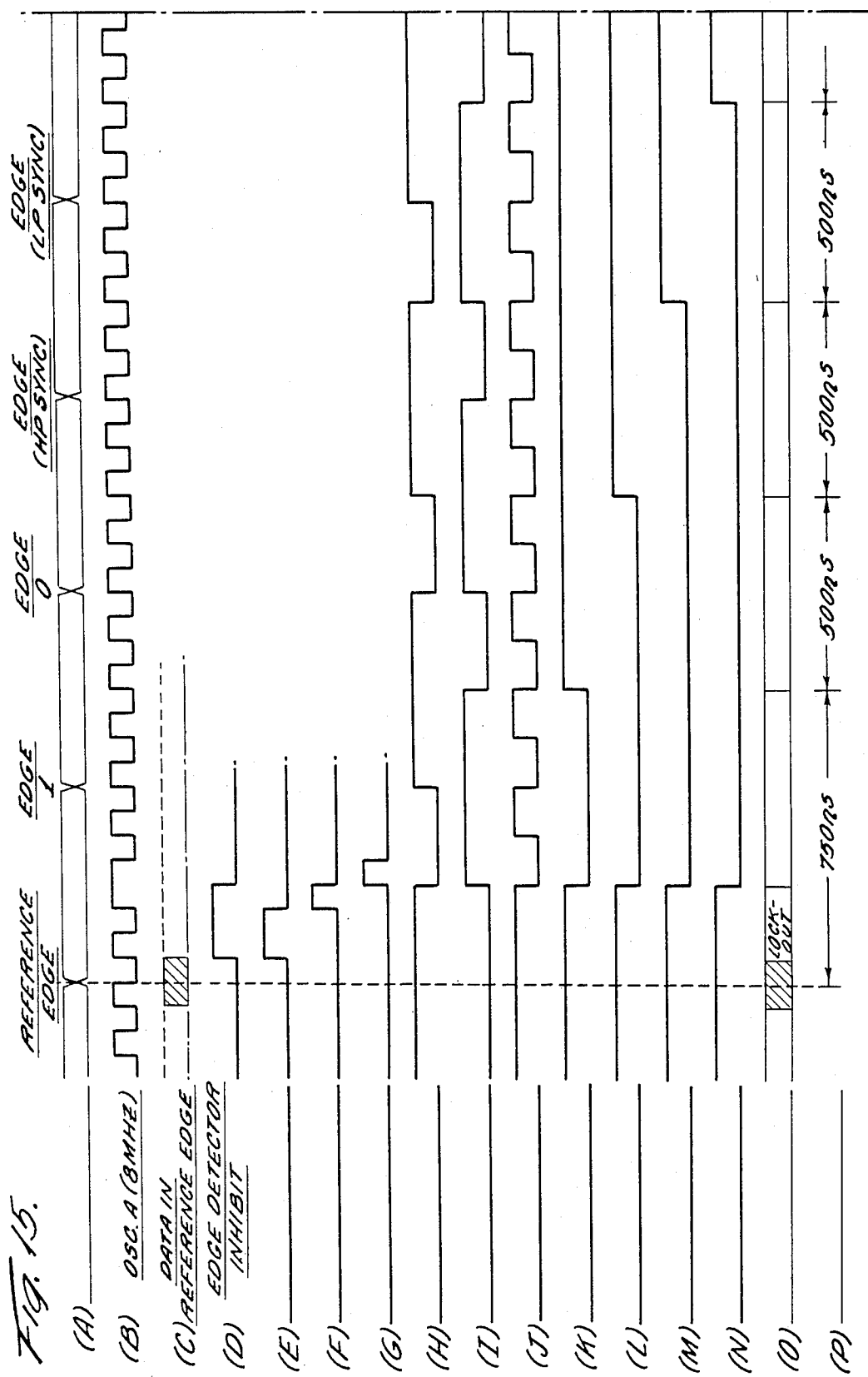

CABLE SYSTEM FOR DIGITAL INFORMATION

This is a continuation of co-pending application Ser. No. 803,894 filed on Dec. 2, 1985, now abandoned.

RELATED PATENT APPLICATIONS

Certain features and aspects of the system shown and/or described herein are disclosed and/or claimed in applications Ser. No. 803,811, entitled METHOD AND APPARATUS FOR ENCODING AND TRANSMITTING SIGNALS, and Ser. No. 803,812, entitled SYSTEM AND METHOD FOR TRANSMITTING INFORMATION, both of the present inventor William P. Rogers and filed of even date herewith.

BACKGROUND OF THE INVENTION

The present invention relates to cable systems for effectively transferring parallel digital signals between spaced-apart sets of connector elements, for example between connector plugs or the like.

There are many situations in which parallel signals are to be conveyed in at least one direction between a first multi-connector plug and a second multi-connector plug. One example of this, in connection with which the present invention will be described hereinafter in detail by way of specific example, is in connecting a multi-element connector on a CPU front-end processor to a multi-element connector on a remote modem by way of a cable, so that the information contained in parallel signals on the connector elements of the front-end processor may be transferred to the modem in parallel form, and vice versa.

In many applications it is also desirable that such cable interconnections be capable of removal and replacement, so that different interconnections, or no interconnection, can be provided at will. In such applications it would obviously be highly undesirable to provide fixed, permanent connection to the cable, as by soldering, for example. Instead, quick-disconnect connector plugs are required at each end of the cable and on the equipment to be interconnected.

It is known to utilize for such purposes a multi-conductor cable containing at least one conductor for each parallel signal to be transmitted, and to provide a suitable multi-conductor cable connector on each end of the cable. However, as the number of parallel signals, hence the number of conductors in the cable, is increased (e.g. above 15 or so), the cable becomes thicker, heavier, more expensive and more difficult to handle and to dress in the desired positions.

Accordingly, an object of this invention is to provide a new and useful cable system for conveying parallel signals from one set of connector elements to another.

Another object is to provide such cable system which is relatively small, light, inexpensive and easy to handle and dress.

SUMMARY OF THE INVENTION

In accordance with the invention the above and other objects of the invention are achieved by the provision of a cable capable of conveying serial digital information and having a quick-disconnect connector plug assembly at each of its ends, a first of which connector plug assemblies carries a parallel-to-serial converter and the other of which carries a serial-to-parallel converter, whereby parallel digital information supplied to the first connector plug assembly is converted to serial form and transmitted by the cable to the other connector plug, where it is converted back to parallel form. Preferably, both connector plug assemblies carry both a serial-to-parallel converter and a parallel-to-serial converter, so that the above-described method of transferring digital information can take place in both directions.

In a presently preferred embodiment, supply power is provided to each converter from an outside source, preferably from power supply means supplied with line power from an ordinary ac line source. Also, in a preferred embodiment which uses both a parallel-to-serial and a serial-to-parallel converter in each connector plug assembly, the cable comprises two twisted-pair lines, one for each direction of transmission of the serial information.

In other embodiments, entirely other types of cables may be used; for example, a fiber-optic cable having a connector plug assembly at each of its ends may be used to transmit the serial information between the connector plug assemblies in optical form.

BRIEF DESCRIPTION OF FIGURES

These and other objects and features of the invention will be more readily comprehended from the following detailed description of representative embodiments thereof, taken with the accompanying drawings, in which:

FIG. 2 is a perspective view, with parts broken away, of a cable system embodying the invention in a presently-preferred form;

FIG. 2A is an enlarged fragmentary sectional view showing the interior of the cable 40 used in FIG. 2;

FIG. 2B is an enlarged fragmantary sectional view showing the interior of cable 80 of FIG. 2;

FIG. 2C is a front face view of the RS232 Interface 16.

FIGS. 10 and 11 are graphical representations showing waveforms with reference to which the typical nature of the information conveyed by the system will be described;

FIGS. 12 and 13 are graphical representations of various signals occurring in the MUX and DEMUX units of a preferred embodiment of the invention, respectively;

FIG. 14 is a functional block diagram of a preferred form of input transition timer for use in the receiving portions of each cable connector plug assembly; and FIG. 15 is a series of timing diagrams or graphs, to the same time scale, illustrating the operation of the timer of FIG. 14.

DETAILED DESCRIPTION OF SPECIFIC EMBODIMENTS

Figure 1:
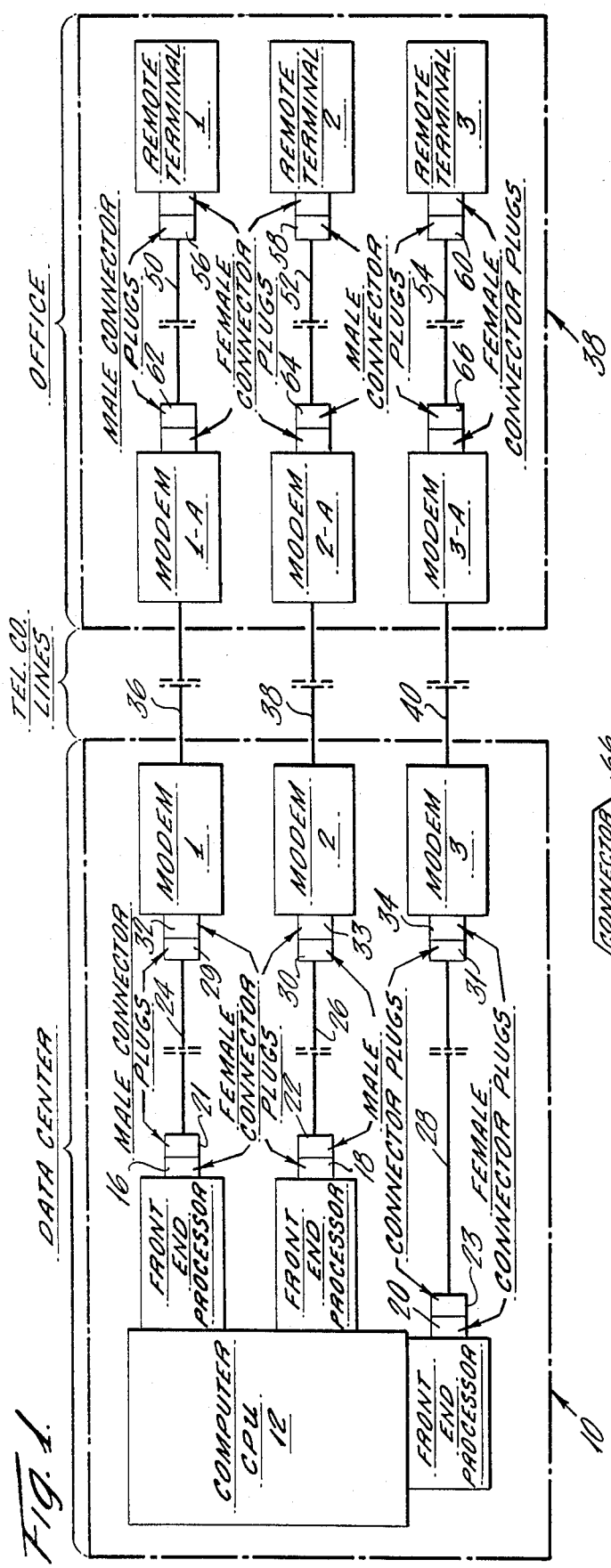
FIG. 1 is a block diagram illustrating one use of the invention.

Referring to the specific embodiments of the invention shown in the figures by way of example only, and without thereby in any way limiting the scope of the invention, FIG. 1 illustrates one communication system to which the invention is applicable. Here there is shown a data center 10 at which there is located a computer CPU 12 having front end processors FEP-1, FEP-2 and FEP-3. Such front-end processors typically have from 16 to 64 or more ports to which modem cables may be connected. The purpose of the front-end processors is to relieve the host computer of the processing burden uniquely associated with maintaining communications between elements of a data communications processor. The FEP's 1, 2 and 3 are provided with respective FEP female connector plug units 16, 18 and 20 mounted thereon, each containing multiple female connector members presenting parallel signals for transmission to associated modems (for example, MODEM 1, MODEM 2 and MODEM 3, respectively), and also having female connector members for receiving signals delivered to them from such modems. In a typical example, connector plug units 16, 18 and 20 and each of the other interunit connector plug units may have 25 connector members, as in the EIA Type RS-232-C connector. Male connector plug units 21, 22 and 23 contain connector members mating with the female connector members of plug units 16, 18 and 20 respectively.

Communication lines 24, 26 and 28, commonly referred to as data set cables, connect male connector plug units 21, 22 and 23 to male modem connector plug units 29, 30 and 31 which in turn are matable with corresponding female connector plug units 32, 33 and 34 mounted on respective modems 1, 2 and 3 to permit two-way transmission of signals between the FEP's and the modems. The other ends of the modems are operatively connected to the adjacent ends of telephone company lines 36, 38 and 40 by conventional connectors, not shown.

More remote from the data center 10 is an office 38 containing, in this example, remote terminal 1, remote terminal 2 and remote terminal 3, which may be word processors, financial accounting computers, personal computers, etc. In this instance it is desired to connect the remote terminals for two-way communication with the CPU 12 by way of the telephone company lines 36, 38 and 40, the modems 1, 2 and 3 and the FEP's 1, 2 and 3 at the data center. This is accomplished by means of the modems 1A, 2A and 3A at the office, and the data set cables 50, 52 and 54 provided at one of their ends with connector plug units 56, 58 and 60 and at their other ends with connector plug units 62, 64 and 66, respectively, for plug-in connection with corresponding connector plug units on the modems 1A 2A and 3A and on remote terminals 1-3.

It will be understood that each of the modems shown may be at a substantial distance from its corresponding FEP or remote terminal, e.g. 100 to 1,000 feet. This is primarily because the modems are usually located where the telephone company lines enter the building, which is normally at a substantial distance from the computer CPU and the remote terminals.

Further, it will be understood that usually, and in this example, the FEP's, modems and remote terminals are designed to accept and utilize parallel digital signals presented to them on the various connectors shown, which signals typically consist of data and clock pulses together with a substantial number of control and signalling pulses for establishing proper contact, lock-in and other functions.

In FIG. 1 the data set cables and the connector plug units at each of their ends are shown only schematically, and in a prior-art system each such cable would comprise one conductor for each of the operative pins on the connectors. In the present example, this could involve a 25-conductor cable, if all pins are used; such cables are expensive, as well as bulky and difficult to place and dress in a convenient, unobtrusive manner. In one of its aspects, the present invention replaces such a multi-conductor cable with a much simpler communication line, for example a cabling containing over most of its length only two twisted-pairs of wire, one pair transmitting serial signals in one direction and the other pair transmitting serial signals in the other direction. To enable this operation, each of the connector plug assemblies secured to the opposite ends of each data set cable such as 24 preferably includes both a serial-to-parallel and a parallel-to-serial converter, whereby parallel signals travelling in either direction will be placed upon the data set cable in serial form, and at the opposite end of the line will be converted back to parallel.

Since all of the cables and connector plug assemblies may be the same, only data set cable 24 and its connector assemblies will be described in detail. Physically, the form of cable assembly of the invention which is shown in FIGS. 2, 2A and 2B is suitable for use between each of the modems of FIG. 1 and its associated FEP or remote terminal, and in this example it will be assumed that it is used for all modem connections. Numerals used in FIG. 2 which correspond to those used in FIG. 1 denote corresponding parts.

Referring then to FIGS. 2, 2A and 2B, in this example the cable connector system comprises two identical converter plug units 60 and 62, each comprising a connector pin portion such as 66 provided with a set of 25 male connector pins such as 68 mounted at one end of a generally rectangular metal or plastic plug housing 70 and adapted to plug into the connector plug units 16 and 32 on the FEP-1 and Modem-1. At the other end of each of the units 60 and 62 is provided a set of 7 male connector members such as 74, adapted to mate with the corresponding 7 female connector members of female plugs 76 and 78 respectively. The plugs 76 and 78 are connected to 7-wire cables 80 and 82 respectively, shown in FIG. 2B, which are typically only a few feet long and provided at their other ends with seven-pin female plugs 83 and 84, respectively. These plugs are adapted to mate with male plug units 85 and 85A mounted on dc power supply units 86, 86A respectively. The latter power supply units are mounted adjacent the respective plug units 16 and 32. The power supply units are provided with ac line cords 87 and 87A terminating in ordinary ac wall plugs such as 88 for plugging into corresponding ac power-line sockets adjacent the equipment. Each of the power supply units contains a small ac power supply, with appropriate rectifying and filtering elements, for providing a relatively low dc voltage, for example 18 volts isolated from ground, to the converter plug units 60 and 62, wherein it may be adjusted to +9 and −9 volts.

Also provided on the power supply units are 5-pin male connector plugs such as 88, matable with female 5-pin plugs 89, 89A on the opposite ends of 4-wire cable 90. The latter cable contains the two twisted-pair lines, as shown in FIG. 2A, which carry the serial multiplexed signals. A ground wire may optionally be included, and if used may be in the form of an outside cable shield. It is these two twisted-pair lines which are typically of substantial length, e.g. up to 1,000 feet, and present very substantial advantages in reduced expense and size as compared with multi-conductor lines of perhaps 25 conductors of the same length previously used for the same general purpose. Furthermore, such twisted-pair lines are often already in place in may buildings, having been previously used for other purposes, or installed for possible future use, and use of such existing lines for cable 90 will generally provide a substantial financial saving. In some cases a single twisted-pair line may be used between the connectors of the connector plug assemblies, either when transmission is to be only in one direction or when the system permits the line to be used alternately for transmission in both directions. However, it is here preferred to utilize a separate line for each direction of transmission, within a single cable, and the invention will be described with particular reference to such embodiment.

It will be understood that, in use, one merely plugs each of the connector plugs 89 and 89A at the opposite ends of the 4-wire cable 90 into the power supply plug receptacles such as 88, plugs each of the 7-wire cables into one of the power supply units and the associated converter plug unit 60 or 62, and plugs the two ac line cords 87 and 87A into ac wall sockets adjacent each power supply unit. Inside the power supply units the two twisted-pair lines of cable 90 are directly connected to the two twisted-pair lines in each of cables 80 and 82, to complete the two twisted-pair line extending from converter unit 60 to converter unit 62.

It will also be understood that in other embodiments the dc power for each converter unit may be provided completely independently of the signal cables, e.g. through the plug unit 16, in which case the two twisted-pair lines may extend directly from converter plug 60 to converter plug 62, rather than by way of the power supply units; or a "free-standing" power supply unit may be used, supported only by the signal cable rather than being mounted to a frame.

Figure 3:
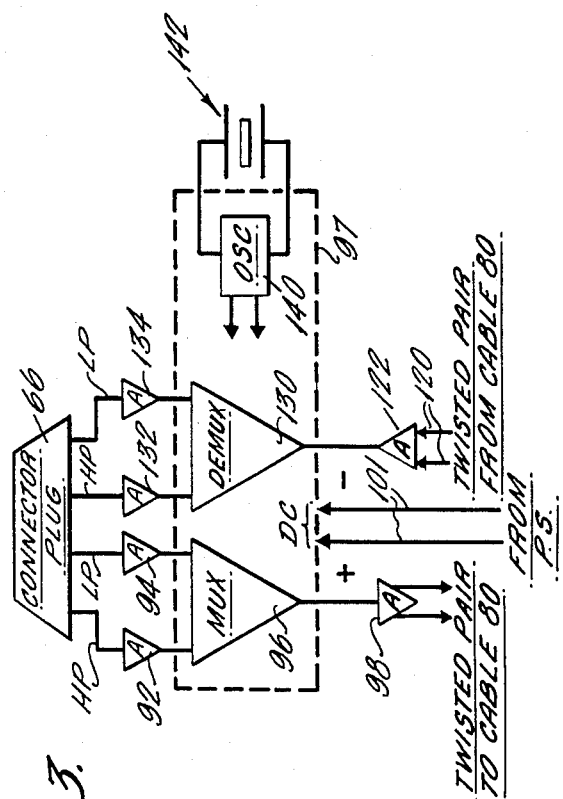
FIG. 3 is a block diagram of the electrical system preferably used in the connector plug assemblies of FIG. 2.

FIG. 3 illustrates broadly the electrical circuitry mounted within the case of each of the connector plug assemblies 60 and 62 of the cable connector system. For the present purposes it is assumed that the circuitry shown is that in the connector plug housing 70 of converter plug unit 60, which is plugged into connector plug receptacle 16. However, the same type of unit would be used in the converter plug unit 62 which is plugged into connector 32 of MODEM 1, and in all of the other converter plug units secured to all of the other cables shown in FIG. 1.

In FIG. 3, it is assumed that the connector pin assembly 66 has 25 pins, two of which are used for data pulses and clock pulses to be delivered to Modem-1 from FEP-1, two of which are to receive data and clock pulses from Modem-1, one of which provides a frame ground, one of which provides a signal ground, two of which constitute + and − voltage test points, and the remaining 16 of which are for infrequently-changing control signals, used in both directions of transmission.

While the exact nature and operation of all of the parallel signals is not part of this invention, Table I shows a typical use of the 25 pins in the converter plug assembly 60 on FEP-1, the purposes of which will be apparent to one skilled in the art.

TABLE I

| PIN | SOURCE | SIGNAL | SIGNAL ABBREVIATION |
|---|---|---|---|
| 1 | EQUIP | FRAME GROUND | FR GND |
| 2 | DCE | SEND DATA | SD |
| 3 | DTE | RECEIVE DATA | RD |
| 4 | DTE | REQUEST TO SEND | RTS |
| 5 | DCE | CLEAR TO SEND | CTS |
| 6 | DCE | DATA SET READY | DSR |
| 7 | EQUIP | SIGNAL GROUND | SIG. GND |
| 8 | DTE | CARRIER DETECT | CD |
| 9 | EQUIP | TEST VOLTAGE + | +TSTV |
| 10 | EQUIP | TEST VOLTAGE − | −TSTV |
| 11 | DTE | SELECT TRANSMIT FREQUENCY | SEL XMIT $F_X$ |
| 12 | DCE | SECONDARY CARRIER DETECT | SEC CD |
| 13 | DCE | SECONDARY CLEAR TO SEND | SEC CTS |
| 14 | DTE | SECONDARY SEND DATA | SEC SD |
| 15 | DCE | SEND CLOCK | SEND CK |
| 16 | DCE | SECONDARY RECEIVE DATA | SEC REV DATA |
| 17 | DCE | RECEIVE CLOCK | REV CK |
| 18 | DCE | LOCAL LOOPBACK | LOCAL LOOPBACK |
| 19 | DTE | SECONDARY REQUEST TO SEND | SEC RTS |
| 20 | DTE | DATA TERMINAL READY | DT RDY |
| 21 | DCE | SIGNAL QUALITY | SQ |
| 21 or | DTE | REMOTE LOOPBACK | REMOTE LOOPBACK |
| 22 | DCE | RING INDICATOR | RI |
| 23 | DCE | SIGNAL RATE DETECT | SIG RATE DET |
| 23 or | DTE | SIGNAL RATE SELECT | SIG RATE SEL |
| 24 | DTE | SEND CLOCK | SEND CK |
| 25 | DTE | MAKE BUSY | MAKE BUSY |

DCE indicates that the signal is from the MODEM end (e.g. reaching converter plug unit 60 from Modem-1), and DTE indicates that the signal is from the CPU or from the remote terminal end (e.g. reaching converter 60 from CPU 12). The signals on pins 21 and 23 in TABLE I can arrive from either direction, although most commonly from the MODEM end. The levels on pins 9 and 10 are not transmitted, and merely constitute test voltages which can be contacted with a probe when connector 21 is removed. The frame ground on pin 1 is not sampled but is dc-connected to ground, and the signal ground is not sampled but is used as a reference for the signals on converter plug unit 60.

FIGS. 10 and 11 show typical input signals applied to converter plug units 60 and 62, to illustrate the general magnitudes of the frequencies and time intervals typically involved, in this case for half-duplex operation.

In FIG. 10 the signals named at the left originate at an FEP-1 of the CPU, while those named at the right originate at the Modem 1. In FIG. 10A there is shown a Data Terminal Ready signal, constituting a high level produced by the terminal when it is in a ready condition; this signal may persist all day, or for at least minutes at a time. At 10B is shown a Data Set Ready signal, originating at the CPU, which also is typically on for hours or at least minutes. FIG. 10C shows a Request To Send signal from the terminal end, consisting here of two spaced-apart pulses each of a duration to encompass a useful block of data; FIG. 10D shows two corresponding Clear To Send pulse signals from the MODEM end, only slightly delayed with respect to the Request To Send signal, each pulse being of comparable duration to the Request To Send pulses. As represented by the shaded area in FIG. 10E, the terminal equipment has been sending clock pulses continuously, at a high rate, as depicted in FIG. 11A, and a block of high-speed data is sent by the terminal during the pulses shown in FIG. 10F, each such pulse starting after a Clear to Send pulse and ending at the end of the Request to Send Pulse; typical data are illustrated in FIG. 11B.

FIG. 10G shows the Carrier Detect signal originating at the Modem upon detection of data being sent from the remote Modem.

FIG. 10H shows the Receive Clock signal originating at the Modem and derived from the data being sent from the remote Modem.

FIG. 10I shows the Receive Data signal originating at the Modem and resulting from demodulation of the signal sent by the remote modem.

The binary data shown in FIG. 11B are in standard NRZ form and, during each associated clock pulse of FIG. 11A, represent the series of 1's and 0's at the bottom of FIG. 11B. This is the data contained in the envelope of the signals of FIG. 10 indicated by diagonal lines.

The clock pulses of FIG. 11A define a clock rate, which is also the data bit rate, and which may typically be anywhere from about 2,400 to 19,200 bits per second; thus a bit time may be as short as about 52 microseconds. Message lengths (data blocks of FIG. 10F) may vary from about 10 to 2,000 eight-bit characters, i.e. from 80 to about 16,000 bits. Assuming operation at the high-speed end of this ranges, a message of 16,000 bits may be sent in a block having a duration of about 0.832 seconds, with each bit time having a duration of about 52 microseconds. The clock pulses, however, are then considerably shorter in duration than the bit interval, e.g. about half as long, or about 26 microseconds long with 26 microseconds between them. In order for the clock pulses from a terminal or CPU to be sampled and transmitted properly by the sampling systems of the multiplexers used in the present invention, and with the sampling occurring synchronously with respect to the clock pulses at for example an 8 KHz rate (125 microseconds per cycle of sampling of each of the 12 signals), it is desirable to resample each input signal at least twice per system clock cycle, e.g. at least every 26 microseconds; this would merely assure sampling at least at the edges of a clock pulse, and to provide sampling which will assure accurate sensing of when each clock pulse starts and ends (the timing of its edges), at least several samplings per half clock cycle are needed. In fact, the position of a clock pulse edge, or of a data signal transition, can only be detected with a time tolerance about equal to half the time interval at which it is resampled. Accordingly, if one wishes to represent the position of an edge of a 26 microseconds clock pulse with an accuracy of 6 microseconds one should sample at least every 6 microseconds with a very narrow sampling interval (fractions of a microsecond).

As will presently be described, each of the more slowly or infrequently variable signals (i.e. all except the clock end data signals) is generally sampled at a relatively lower rate (at 8 to 14 microsecond intervals, depending on the values of the input signals being sampled), and each of the more rapidly variable signals (the data and clock signals) is generally transmitted with a shorter waiting-time (3.5 to 5.5 microseconds, depending on the values of the signals being sampled).

Referring now to FIG. 3, amplifiers 92 and 94 supply the separate parallel high-priority and low-priority signals, respectively, from plug 66 to a parallel-to-serial multiplexer 96, preferably provided on a semiconductor chip 97 physically located within the plug housing 70 of FIG. 2. The output of the multiplexer 96 is supplied through balanced-output driver amplifier 98 to twisted-pair wires 100. The latter twisted pair extends physically through cable 80, power supply units 86 and 86A and cable 90 of FIG. 2, to Modem-1. DC power from the power supply unit 86 is supplied over the two lines 101.

Conversely, serial digital information arriving from Modem-1 on twisted-pair wires 120 in cable 80 passes through the balanced-input receiver amplifiers 122, and the output of the latter amplifier is supplied to the serial-to-parallel demultiplexer 130 on chip 97. The reconstituted parallel HP information is supplied from demultiplexer 130 through amplifier 132 to appropriate pins of the connector plug 66, while the reconstituted parallel LP information from the demultiplexer is supplied by way of amplifier 134 to other appropriate pins of the same connector plug. It will be understood that each of the amplifier components 92, 94, 132 and 134 designated "A" actually includes a plurality of amplifier devices, as appropriate for their respective functions. Preferably, a timing oscillator 140 is also provided on chip 97, the crystal stabilizing unit 142 for which is connected to the oscillator circuit on the chip but is mounted separately from the chip within the plug housing.

Figure 4:
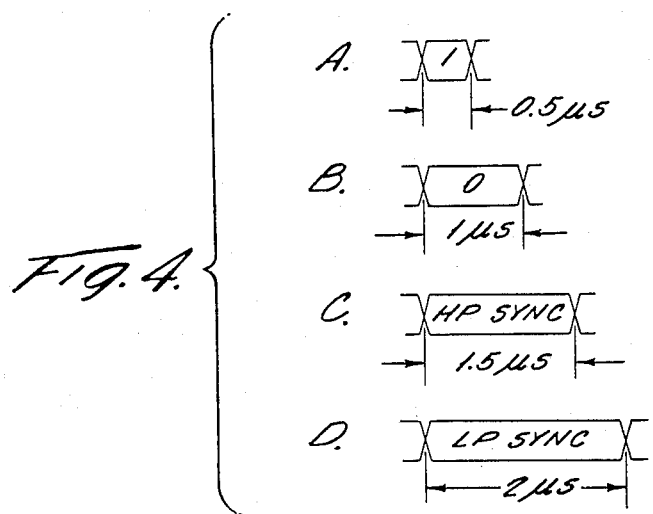
FIGS. 4–7 are graphical representations, to a common horizontal time scale, to which reference will be made in explaining the nature and certain advantages of the encoding system preferably used in connection with the present invention.

FIG. 4 shows the pulse durations which are utilized in this embodiment to represent in serial form on twisted-pair wires 100 the parallel information presented at connector plug 16 of FEP-1. As indicated at A in FIG. 4, a binary 1 is represented by two identical but oppositely poled 0.5 microsecond pulses, one on each of the wires of the twisted pair 100; as shown at B, a binary 0 is represented by two oppositely-poled 1 microsecond pulses; as represented at C, the "HP sync" pulse which identifies high-priority data is represented by two oppositely-poled 1.5 microsecond pulses; and the "LP sync" pulse which identifies LP data is represented by oppositely-poled pulses 2 microseconds in duration, in this example.

Figure 5:
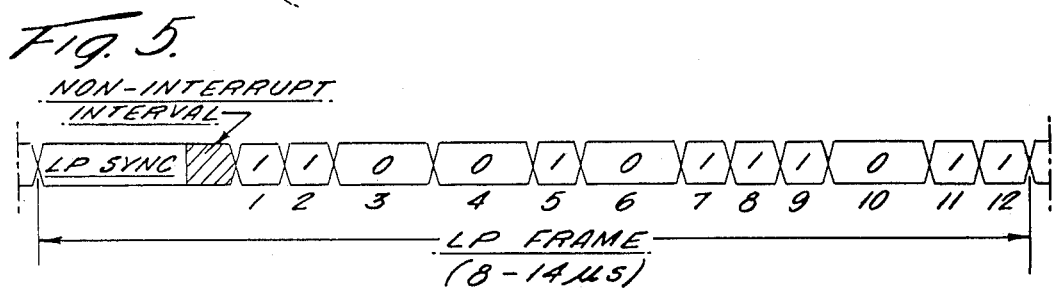
Figure 6:
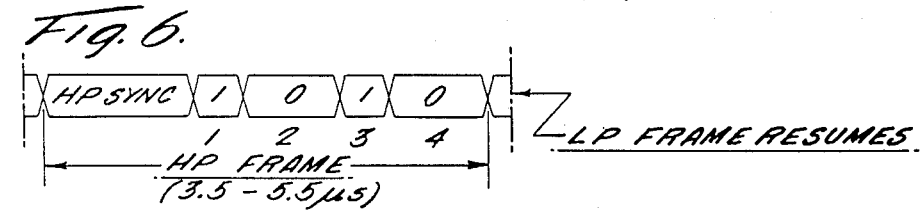

FIG. 5 illustrates a low-priority frame formed by the multiplexer 96, and FIG. 6 illustrates a high-priority frame formed by that multiplexer. Referring to FIG. 5, the 2 microsecond initial pulse labelled "LP Sync" represents the pulse on the two-wire line which identifies the immediately subsequent data pulses as relating to an LP frame. The pulses labelled 1 through 12 represent, by their individual durations, the arbitrarily chosen binary levels of a group of 12 original parallel LP signals supplied to the input of the multiplexer, specifically in this example 110010111011. The frame is then repeated, with numbers of 0's and 1's appropriate to the values of the original parallel low-priority signals at that later time. The terminal half-microsecond portion of the LP sync pulse is cross-hatched to indicate a time interval near the end of the LP sync pulse during which the LP frame cannot be interrupted by an HP frame, for reasons described more fully hereinafter. Unused pins (or pins with constant levels) are not connected to the Mux at their source connector. At their destination connector, corresponding pins are connected to either a + or − voltage from the cable multiplexer power supply. Pins on the cable Mux chip corresponding to unused bits within the multiplexed frame are tied to a + voltage from the cable multiplexer power supply so that they are sensed and transmitted as binary ones and therefore require a shorter transmission time.

FIG. 6 shows the HP sync pulse of duration 1 microsecond followed by 4 data pulses each having a duration which depends upon whether the pulse is representing a binary 1 or 0; in this example the frame is made up of HP bits 1, 2, 3 and 4 is assumed to represent binary digits 1, 0, 1 and 0, respectively.

Figure 7:
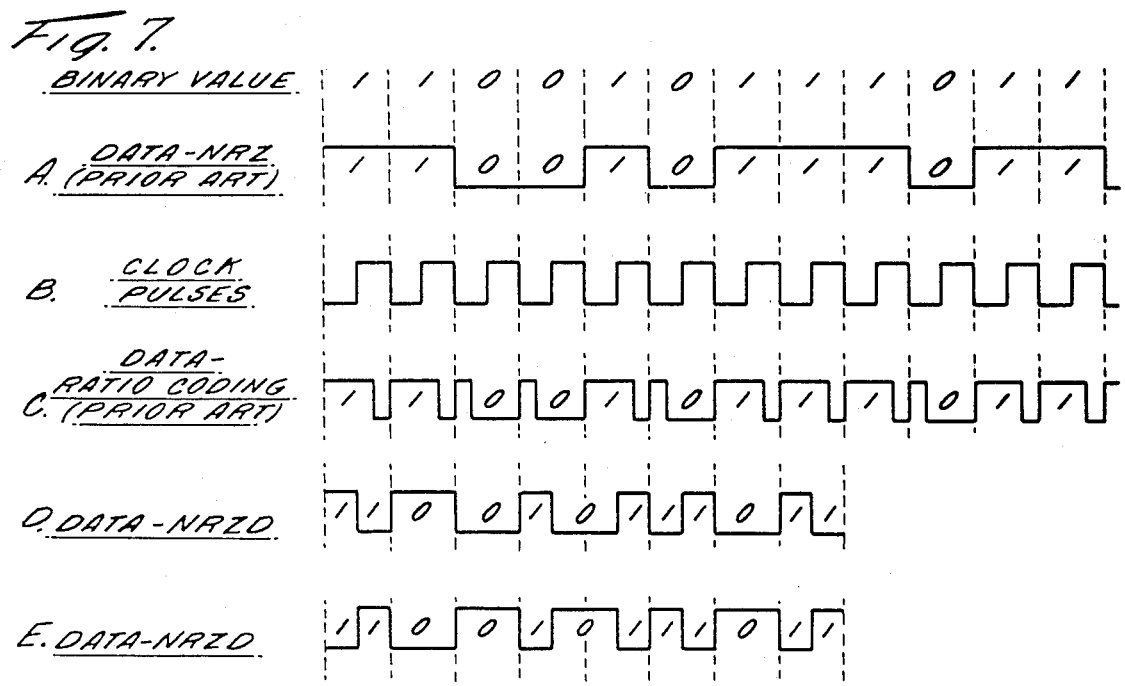

The graphs of FIG. 7 illustrate some of the advantages of the above-described general type of pulse width encoding of information. At FIG. 7A there is shown a previously-known NRZ encoding of the binary digital information 110010111011. It utilizes 12 corresponding time slots or bit intervals of equal durations —in this example about 1 microsecond; a corresponding 1 MHz clock signal is shown at 7B. The bit rate is constant, and each bit interval contains a level which is either Low or High depending upon whether a 0 or 1 is represented. The total time for transmission of this information is therefore 12 microseconds.

In FIG. 7C there is illustrated a known ratiocoding system used to represent the same information. In this encoding system a 1 is represented within each 1 microsecond time slot by a High level which is longer than the Low level, while a 0 is represented by a Low level longer than the High level. Again, the bit rate is constant and 12 microseconds are required for the frame.

At FIG. 7D there is shown an encoding scheme according to a preferred form of the invention, designated as NRZD encoding, according to which each successive pulse begins substantially immediately upon termination of the preceding pulse. Since in this example there are 8 binary 1's and 4 binary 0's in the frame, there are 8 half-microsecond pulses and 4 one-microsecond pulse, the total time required to represent the information therefore being 8 microseconds. If all of the bits had been 1's, the time to represent the information would be only 6 microseconds, or one-half the time required by the conventional encoding systems of FIGS. 7A and 7C. If all pulses had been 0's, rather than 1's, the time required to represent the information would be 12 microseconds, as in the priorart systems; if the information is random (half 1's and half 0's, on the average), the average time required will be 9 microseconds. In many systems it is known ahead of time that either 0's or 1's will predominate, and by representing the more frequently-occurring binary value by the shorter pulse duration, the required time for a complete representation of the data will always be less than 8 microseconds, in the particular system under discussion.

FIG. 7E shows the same encoding scheme as in FIG. 7D, but with the levels reversed in polarity. For practical reasons it is preferred in the present embodiment to use both of the waveforms of these two figures, one on each of two twisted-pair wires, to give the dual balanced waveform depicted in FIG. 5.

An important advantage of the reduction in frame time provided by the invention is that where the pulses of different durations represent successive values of a plurality of repetitively-sampled original signals, the shorter frame time resulting from the invention means that each of the original signals will be sampled more frequently than otherwise —that is, the frame can be refreshed more frequently, to give better representation of the information.

FIGS. 5 and 7D also illustrate another aspect of the preferred form of the invention, according to which the successive encoded pulses are provided with alternating polarities. The result of this is that the transmission band required to send the encoded signals with a given degree of distortion is only about half that which would be required for the signals of FIGS. 7A or 7C, for example. Accordingly, in the above example, a transmission channel having a maximum modulation rate of 1 Mhz can transmit a steady stream of zeros at a 1 mbps rate, where each zero is represented by a 1 microsecond pulse and alternate pulses are of opposite polarities. The same transmission channel can transfer equally well a steady stream of one's, each represented by a half-microsecond pulse, with every alternate pulse having an opposite polarity, at a 2 mbps rate. If the signal being transmitted averages half zeros and half ones, its effective transmission rate will be 1.5 mbps, which can be passed through a channel having a maximum modulation rate of 1.0 mbps without appreciable distortion. It has been found that in such a system of the invention one can provide reliable operation over about a 1000-foot length of good twisted-pair cable; if a lower maximum modulation rate of say 500,000 is used, good results can be obtained with a 3,000–4,000 foot cable.

It is noted that the encoding technique of the preferred form of the invention as depicted in FIG. 7D, for example, is also very easy to implement, since in essence one need only provide a waveform which alternates between two fixed levels, and maintain it at each level for either one of two time intervals, depending upon whether the level is representing a 1 or a 0.

In the above discussion of FIG. 7, the effects of the LP and HP sync pulses have not been considered, since they are not necessary in all embodiments of the novel encoding system; their main function is to differentiate between HP and LP data when, as in the preferred embodiment, the input signals are classified and divided into HP and LP signals and processed differently. In other forms of the invention such classification and differentiation need not be employed, and although some form of synchronizing or timing may be desirable it can be accomplished in very different ways. However, in the preferred embodiment now being described, a complete LP frame includes an LP sync pulse as shown in FIG. 5, and a complete HP frame includes an HP sync pulse, thus adding 2 microseconds to the LP frame time and 1.5 microseconds to the HP frame time, giving frame times for the examples of FIGS. 5 and 6 of from 8 to 14 microseconds for the LP frame and from 3.5 to 5.5 microseconds for the HP frame.

Figure 8:
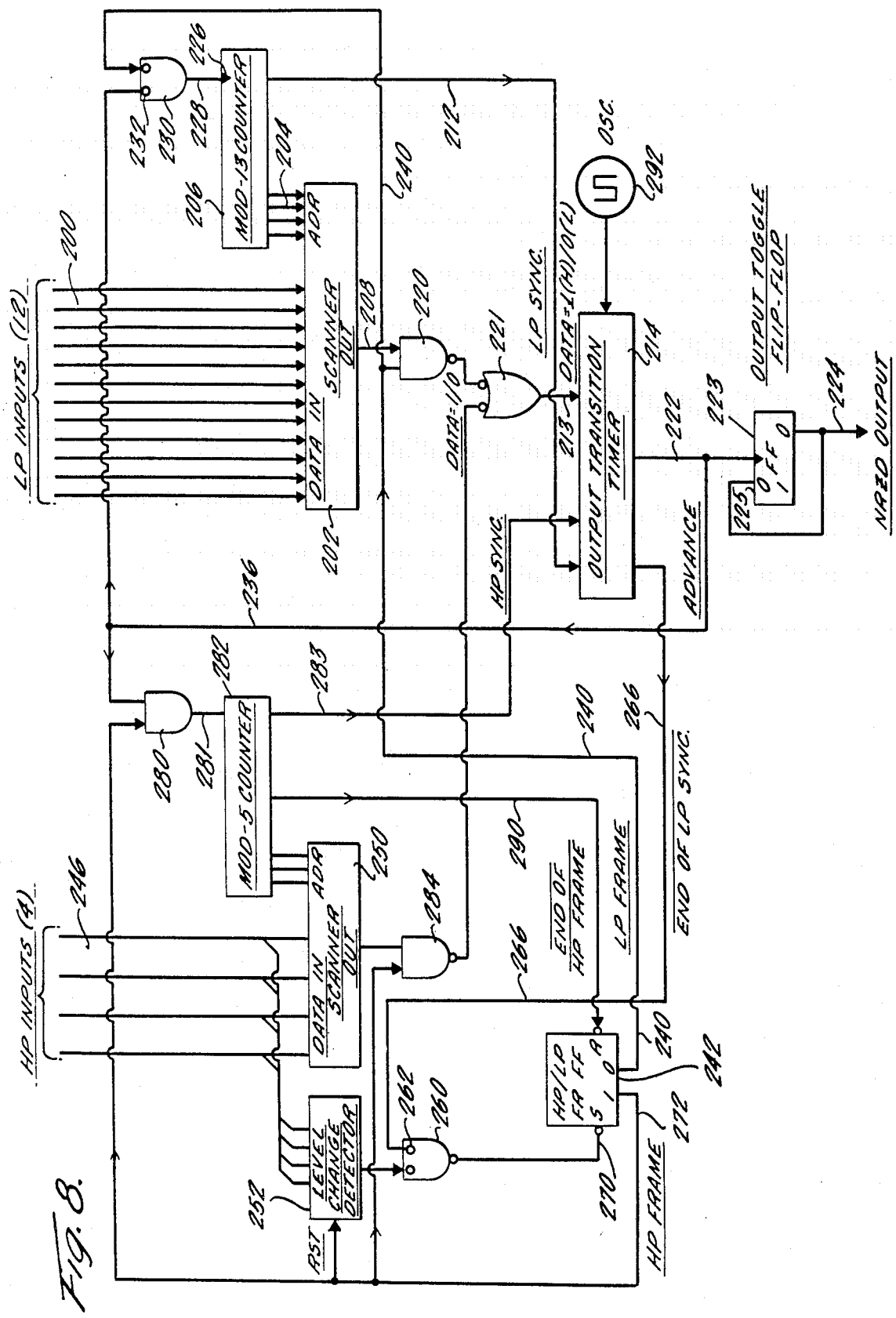
FIG. 8 is a block diagram of the electronic circuitry preferably employed in both of the connector plug assemblies to achieve parallel-to-serial conversion.
Figure 9:
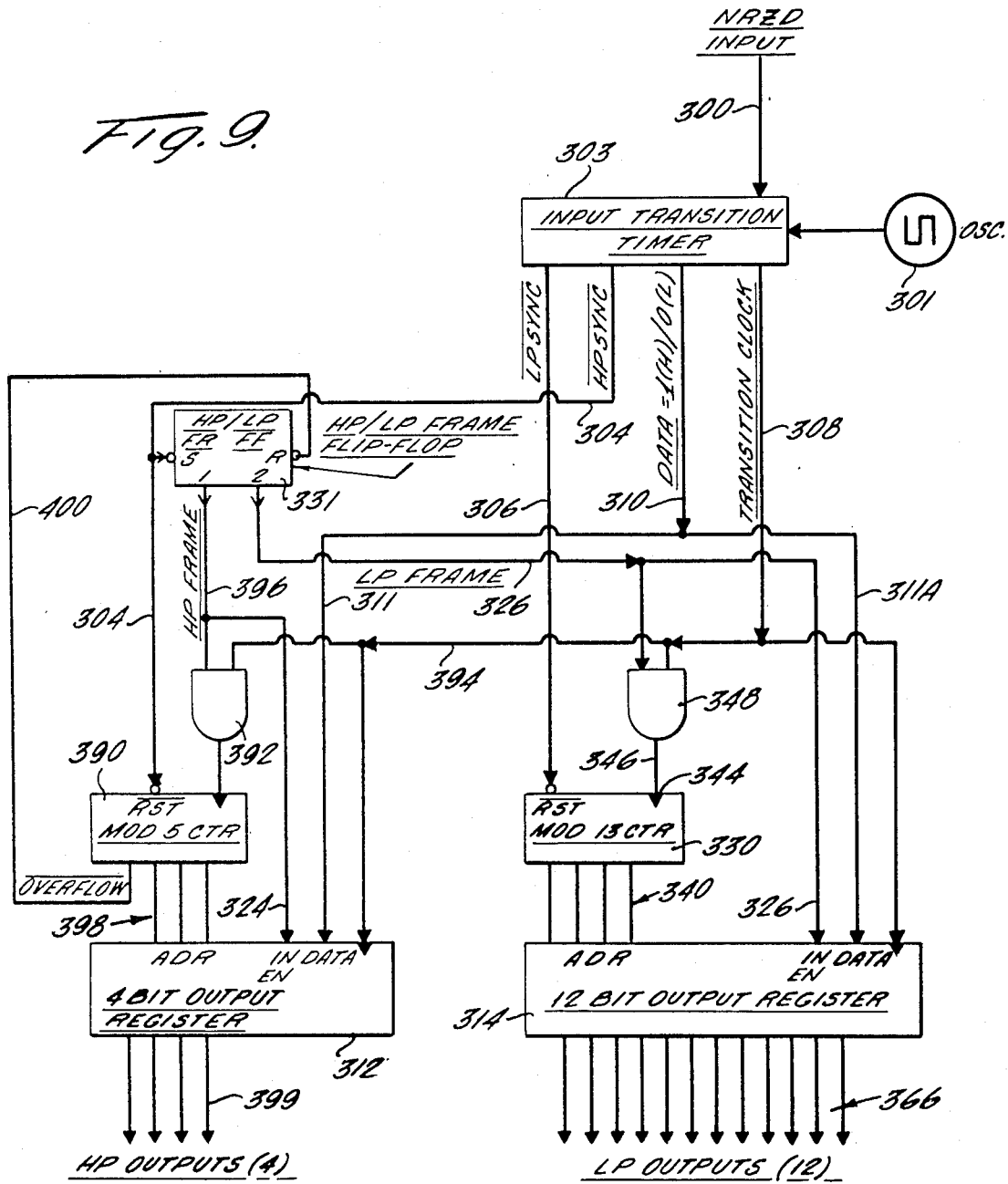
FIG. 9 is a block diagram of the electronic circuitry preferably employed in both of the connector plug assemblies to achieve serial-to-parallel conversion.

FIGS. 8 and 9 show further details of the preferred form of the multiplexer and demultiplexer systems depicted more generally in FIG. 3.

Referring first to FIG. 8, there are shown 12 low-priority signal input lines 200 from the amplifiers 94 of FIG. 3, carrying the original, parallel, moreslowly variable LP signals. These input lines are connected to the signal input terminals of a 12-input scanner 202. In response to successive addresses supplied thereto over lines 204 from Mod-13 counter 206, the scanner 202 in effect connects successive ones of the input lines momentarily to the single output line 208 of the scanner. The scanner thus operates as a repetitive sampler of the 12 input signals thereto. In addition, the first, thirteenth, twenty-fifth, etc. pulses from the Mod-13 counter are applied directly over LP sync line 212 to the output transition timer 214; these pulses constitute the timing source for the generation of the "LP Sync" signal by the output transition timer, which sync signal precedes and serves to identify the immediately following group or block of pulses as LP signals.

In the absence of high-priority information then, the LP input signals are sampled and the binary 1 and 0 samples passed serially through the normally-transmissive NAND gate 220 and through OR gate 221 to the output transition timer 214; the digital data on the signal input line 213 of the transition timer are therefore in serial form, the successive pulses thereof indicating the corresponding levels of the parallel signals at the input to the scanner.

The output transition timer 214 responds to all of its input signals to produce on its output line 222 timing pulses which determine when transitions in the state of output toggle flip-flop 223 occur. 223 is a so-called D flip-flop which upon the occurrence of each leading edge of a timing pulse on line 222 assumes at its output line 224 a state (High or Low) opposite that of its D input on line 225. Accordingly, the output of flip-flop 223 executes a transition between its High and Low states each time a timing pulse on line 222 appears, and the time for which it remains in either state depends on the time between successive timing pulses. The output on line 224 is therefore the desired NRZD signal.

In the absence of changes in the HP signals, the output transition timer 214 first produces on its output line 222 a timing pulse which initiates the Low-Priority Sync pulse of 2 microseconds duration, followed by a timing pulse which terminates the sync pulse. The next timing pulse changes the state of the flip-flop 224 one-half or 1 microsecond later, depending upon whether a 1 or a 0 is to be represented.

The Mod-13 counter 206 is not free-running, but only advances its count to shift sampling to the next LP input signal in response to a clock pulse delivered to its clock input terminal 226 over line 228 from AND gate 230. One input terminal 232 of the latter gate is supplied with Advance signals from output transition timer 214, over Advance line 236. These Advance pulses are the same as the timing pulses on line 222, and are denoted as Advance pulses to facilitate easy comprehension of their functions. Accordingly, each Advance pulse occurs at a transition in the output NRZD signal, and serves to shift the scanner to the next LP input signal, to produce a binary sample "telling" the output transition timer whether to wait 1 or 0.5 microseconds before producing the next timing pulse. The other input to the AND gate 230 is supplied over output line 240 from the High-Priority, Low-Priority Frame Flip-Flop (HP/LP FR FF) 242, which in its normal state supplies to AND gate 230 a level which renders it transmissive and permits the Advance signals to pass through the AND gate 230 and to advance the Mod-13 counter, during transmissions of LP signals.

The operations just described for encoding the LP signals can be utilized in systems not including special provision for the handling of HP signals, but since such special provisions are used in the preferred embodiment of this invention and cooperate to reduce transmission bandwidth requirements, they are shown and described herein, and claimed per se in my above-mentioned copending application entitled SYSTEM AND METHOD FOR TRANSMITTING INFORMATION.

Considering now the circuitry shown in FIG. 8 for accomplishing special handling of the HP signals, the four high-priority information input lines 246 carrying the parallel HP signals are supplied both to the signal input terminals of a conventional four-input scanner 250, operative when activated to sample the HP signals, and to a conventional level-change detector 252 for sensing when a change occurs in any of the four input signals. Normally, during the transmission of low-priority signals, the four-input scanner is not activated and produces no output. However, when one of the four HP signals changes level, this change in level is detected by the level change detector 252, which may be a device of known form which, in effect, merely stores the most recent levels of the four signals and then compares each of them with its next subsequent value to detect any changes therein. Upon such detection of a change of level of any of the four signals, the output of detector 252 changes to its opposite state. The latter change in level passes through normally-transmissive NAND gate 260, the control terminal 262 of which is connected to an END OF LP SYNC line 266 which normally permits this to occur. The resultant change in level at the Set input 270 of the HP/LP FR FF 242 causes it to switch immediately to its opposite state, in which its output line 240, denoted LP FRAME, goes Low and its other output line 272 (marked HP FRAME) goes High. This change on line 240 makes AND gate 230 nonresponsive to the Advance pulses so as to terminate the LP signal sampling by scanner 202, and renders NAND gate 220 nontransmissive so that the output of scanner 202 is isolated from the output transition timer 214; at the same time, the change on line 272 renders NAND gate 280 transmissive of the Advance pulses applied to it over line 236, and the latter Advance pulses are thereby applied over line 281 to the Mod-5 counter 282 to operate it through one cycle of five counts and to step the scanner 250 through its five positions, after which HP/LP FR FF 242 reverts to its normal state and supplies a signal to the reset terminal RST of level change detector 252 to reset it.

Accordingly, during the Mod-5 count, in response to the next Advance pulse, Mod-5 counter 282 puts out on line 283 a High-Priority Sync timing pulse for application to output transition timer 214, which responds by holding flip-flop 223 in whatever state it is in for 1.5 microseconds, to form the NRZD HP Sync pulse; at the end of this sync pulse the next Advance pulse is applied over Advance line 236 through AND gate 280 to the Mod-5 counter to produce the first address signal in the 4-input scanner 250 and thereby sample the first HP input signal. This sample passes through NAND gate 284 (normally non-transmissive, but rendered transmissive by the HP FRAME signal on line 272) and OR gate 221 to the output transition timer 214, which causes the timer 214 to produce a half or a one microsecond pulse at the NRZD output line 224 depending on the sample. At the end of this output pulse, the next Advance pulse is generated and advances the Mod-5 counter by one count and the input scanner to its next address, analogously to the operation of Mod-13 counter.

In this way the information on the four high-priority input lines is encoded on the NRZD output line 224 in the form of successive pulses of alternating polarity, one immediately following the other, and with either half-microsecond or one-microsecond durations depending upon whether they are representing a 1 or a 0. If no further level change occurs in any of the HP signals, there is no further output from the previously-reset level change detector 252, and the HP/LP FR FF reverts to its normal state in response to the END OF HP FRAME signal produced on line 290 by the end of counting in Mod-5 counter 282. In response to the reversion of the HP/LP FR FF 242 to its normal state, the Mod-13 counter resumes its counting at the point where it left off, thus causing scanner 202 to complete its sampling of the LP frame.

The above-mentioned END OF LP SYNC line 266 is normally supplied by the output transition timer 214 with a level which maintains the NAND gate 260 in its transmissive condition. However, during the latter part of each low-priority frame sync pulse, represented by the shaded area in FIG. 5, the output transition timer produces a level on line 266 which renders NAND gate 260 non-transmissive during such time. Accordingly, if a level change detector pulse occurs in this time interval the LP scanner 202 will nevertheless continue to operate until the end of the LP sync pulse, at which time a change in level on line 266 renders NAND gate 260 transmissive again, and the high-priority frame will begin. The duration of this period of non-interruptability of the LP sampling is in this example about one-half microsecond, so that the maximum time required to produce an HP sample is increased in such event by a half microsecond, to a total of from about 4 microseconds to about 6 microseconds.

It is noted that, with the exception of this time interval near the end of the LP sync pulse, the high-priority frame may inject itself into the low-priority frame at any time, even during the LP frame Sync Pulse and even during one of the LP binary data-representing pulses of one-half or one microsecond normal duration. This will be more fully appreciated from the discussion hereinafter of the timing diagrams of FIGS. 10 and 11.

Internal clock timing for the multiplexer is provided by a clock oscillator 292.

The NRZD output of output toggle flip-flop 223 in this example is passed through balanced driver 98 of FIG. 3 to the twisted-pair line 100, whereby two such NRZD signals of respectively opposite polarities are placed on the two wires, as described previously.

A demultiplexer corresponding to the demultiplexer of FIG. 3, and usable with the multiplexer of FIG. 8, is shown in FIG. 9. In FIG. 9 the double-ended balanced pair of signals on line 120 of FIG. 3 have been passed through the balanced receiver amplifier 122 of FIG. 3 to NRZD input line 300, which conveys them to the signal input of input transition timer 303, clocked in response to timing provided by an asynchronous oscillator 301. Transition timer 303 senses the time of occurrence of each transition in the level of the received signal, and measures the times between successive transitions. After so doing, it applies a pulse to HP SYNC line 304 upon reception of a 1.5 microsecond pulse, applies a pulse to LP SYNC line 306 upon reception of a 2 microsecond pulse, applies a narrow pulse to transition clock line 308 whenever a data-representing transition in level occurs in the received signal and, when data pulses are received representing the original multiplexer input signals to MUX 96 of FIG. 3, applies data levels to data line 310 representing 1's or 0's depending upon whether the received data pulses are 0.5 or 1 microsecond in duration. It is understood that for purposes of the present discussion the data pulses at the DEMUX represent both original "data" signals and original "clock" input signals to the remote MUX, and that the transition clock constitutes narrow periodic timing pulses coincident with the occurrence of transitions in the level of the received NRZD signals (See FIG. 13B).

The data line 310 is connected to the data input terminals of a 4-bit output register 312 and of a 12-bit output register 314 over lines 311 and 311A respectively, the register 312 being used to reconstitute and store the high-priority information and the register 314 to reconstitute and store the low-priority information. Each of these registers is provided with an IN EN terminal, supplied from the respective Enable lines 324 and 326, and effective to permit registering of data from the data line only when the corresponding Enable line is high. The transtion clock pulses are applied to the clock input terminals of the 4- and 12-bit registers, while the LP SYNC pulses are applied to the RESET terminals of Mod-13 counter 330 and the HP SYNC pulses are applied to the set terminal of an HP/LP FRAME FLIP-FLOP 331.

More particularly, during the reception of an LP frame the Mod-13 counter 330 is reset by the pulse supplied to its reset terminal over the LP SYNC line 306. When enabled and clocked, Mod-13 counter 330 then operates over address lines 340, in a conventional manner, to successively address register locations in the 12-bit output register 314, so that the serial data applied to the register over data line 311A will be strobed into appropriate parallel locations therein. In order to time the changes in address and the strobing of the data in accordance with the aperiodic received data, Mod-13 counter 330 is advanced in response to the transition clock pulses which are supplied to its clock terminal 344 over line 346 by way of AND gate 348 so long as LP FRAME line 326 is High to render the AND gate transmissive of the transition clock pulses.

The enabled states of the Mod-13 counter 330 and of the 12-bit output register 314 are both controlled over LP FRAME line 326 by one output of the High-Priority, Low-Priority Frame Flip-Flop 331 (HP/LP FR FF), which in its reset state enables both the Mod-13 counter and the 12-bit output register. So long as low-priority signals are being received, parallel signal levels on the 12 low-priority output lines 366 of the output register 314 will therefore comprise the desired reconstituted parallel binary information for direct supply in parallel form to Modem-1 (FIG. 1). So long as no HP signals are received, this operation continues.

When a high-priority frame is received by the input transition timer 303, the resultant HP SYNC pulse on line 304 shifts the HP/LP FR FF 331 to its opposite or set state, and resets Mod-5 counter 390 to its initialized state in which it is ready to count in response to transition clock pulses. This change of state of flipflop 331 acts over line 326 to disable the 12-bit output register and, through the action of AND gate 348, immediately prevents further counting by the Mod-13 counter. Accordingly, all changes in the output of the 12-bit output register are arrested, and counting by the Mod-13 counter is immediately terminated.

At the same time, the Mod-5 counter 390 begins counting in response to transition clock pulses applied to it through AND gate 392 over lines 308 and 394. During the preceding low-priority signal interval the AND gate 392 was held non-transmissive by the level on the HP FRAME output line 396 of flip-flop 331, applied to one of its input terminals, which level simultaneously held disabled the 4-bit output register 312 over line 324, preventing the registering of any new information in the latter register during low-priority frames. However, as mentioned above, the flipping of the flip-flop 331 to its Set state enables the 4-bit output register and also permits the transition clock pulses to be supplied to the Mod-5 counter to produce the desired counting. Upon each count, the address lines 398 cause 4-bit output register 312 to advance its address, so that the data supplied to the latter register over line 310 are strobed into and registered at the proper addresses, available for parallel output on HP output lines 399.

At the end of the 4 count by the Mod-5 counter, a fifth count produces an overflow output, supplied over reset line 400 to reset the HP/LP FR FF 331 to its "low-priority" state, whereby the Mod-13 counter immediately resumes its count and completes the reconstitution of the low-priority information at LP output lines 366, and the Mod-5 counter and 4-bit output register are disenabled by the HP FRAME signal on line 396.

Accordingly, the original parallel input signals at the input to the multiplexer system of FIG. 8 are transformed into serial form, delivered over the two-wire transmission line to Modem-1 and, at the input of that modem, transferred back to parallel by the demultiplexer of FIG. 9, with any new high-priority information injected by interrupting the transmission of the low-priority information immediately, whenever changes in the high-priority information occur, and with the transmission of the LP information resumed immediately upon the absence of further changes in HP information. The same action occurs for signals travelling in the opposite direction, from Modem-1 to FEP-1.

Further details of the timing involved in the operations of this multiplexer and demultiplexer will be more fully understood from the timing diagrams of FIGS. 12 and 13, in which time increases toward the right of the diagrams.

Referring first to FIG. 12, which relates to operation of the MUX of FIG. 8, at A there is shown the signal produced on LP FRAME line 240 by the HP/LP FR FF 242. In this example it is assumed that an LP frame was underway during the Low portion of the signal at FIG. 12A, was interrupted while the signal at FIG. 12A was High to enable an HP frame to be inserted, and then became Low again to permit the sampling and transmission of the LP signals to be resumed and completed.

At FIG. 12B is shown the relative timing of successive samplings by the Mod-13 counter 206, in this case for 12 parallel input levels of 1101001001010. The times between samplings are one-half or one microsecond depending on whether a 1 or 0 is represented.

In this example the HP frame begins just before the 6th count interval is complete, and the HP frame consisting of an HP SYNC pulse (FIG. 12E) and the four bits 1010 (FIG. 12C) is inserted. Upon termination of the HP frame, the Mod-13 counter begins to operate again, starting with and completing its 6th count interval and continuing with counts 7–12 as if it had not been interrupted. It is noted that when the HP SYNC pulse occurs, its effect is to extend the LP count interval then underway into the HP SYNC pulse, i.e. lengthen it to 1.5 microseconds. This eliminates the portion of the 6th LP count interval already timed-out, so that when the LP count resumes it begins at the start of the 6th count interval and a small amount of time is thereby added to the LP frame time. Significantly, however, the desired prompt sampling of the HP input signals is thereby accelerated, since the HP SYNC pulse is produced and the HP frame completed earlier than would otherwise be the case.

At FIG. 12F is shown the serial data (1/0), namely the levels of the samples of the parallel input signals, appearing at line 213 of FIG. 8; the shaded areas are not true data and are irrelevant.

At FIG. 12G are shown the Advance (transition) pulses, which are spaced apart by 1 or a half microsecond depending on whether a 0 or a 1 was sampled. The corresponding NRZD output produced on twisted-pair line 100 of FIG. 8 is shown at FIG. 12H, and the bit numbers of the LP and HP frames are shown at FIG. 12I.

FIG. 13 shows corresponding waveforms which will occur in the DEMUX of FIG. 9 for the same data content as in FIG. 8. At A there are shown the NRZD input signals delivered over twisted-wire pair input line 300 of Input Transition Timer 303. It will be understood that actually the DEMUX to which MUX 96 of FIG. 3 would supply its serial output would be in the connector plug 29 of FIG. 1, not the DEMUX in the same connector plug as that in which the MUX 96 is located. However, since all MUX's and DEMUX's in the system are the same in this example, the operation will be described as if the DEMUX 130 were supplied with the output of MUX 96.

Returning to FIG. 13, at B are shown the transition clock pulses, each produced on line 308 by timer 303 (FIG. 9) in response to a transition in level of the input NRZD signal on line 300; these are the transition pulses which, used as clock pulses, strobe the data pulses into the proper flip-flop storage devices in the 4-bit and 12-bit output registers, while also being applied to the AND gates 348 and 392 to shift the counting between the Mod-5 and Mod-13 counters at the proper times.

At FIGS. 13C and 13D are shown the LP SYNC pulses and the HP SYNC pulses, produced by input transition timer 303 on lines 306 and 304, respectively. During an LP frame the LP SYNC resets the Mod-13 counter 330 to achieve synchronization between MUX and DEMUX, while the HP SYNC resets the Mod-5 counter 390 to synchronize it.

The data pulses shown at FIG. 13E are produced by the input transition timer, which measures the times between successive transitions in the received data signals and puts out onto line 310 a 1 or a 0 level depending on whether the received data pulse has a duration of 0.5 or 1 microsecond.

The counting by the Mod-5 counter is started and stopped by the changes of state of the HP/LP FR FF 331 shown at FIG. 13F.

FIG. 13G shows the overflow pulse which is applied over line 400 from the Mod-5 counter to HP/LP FR FF 331 to reset it after all four of the HP pulses have been received and stored in the 4-bit output register.

FIGS. 13H and 13I show the timing of the count by the Mod-5 and Mod-13 counters 390 and 330, the Mod-13 count being started by the LP SYNC pulse of 13C and interrupted by the HS SYNC pulse of FIG. 13D, and resuming its count after four counts by the Mod-5 counter.

Referring now in more detail to the nature and operations of the output transition timer 214 of FIG. 8 and the input transition timer of FIG. 9, it will be appreciated that, in performing the operations described above, output transition timer 214 is supplied with an LP SYNC pulse (FIG. 12D) over line 212, with an HP SYNC pulse (FIG. 12E) over line 283 and with 1/0, High-Low data levels (FIG. 12F) from line 213. In response to each LP SYNC pulse, it puts out an Advance pulse 2 microseconds after the immediately-preceding Advance pulse, and 1.5 microseconds after the immediately-preceding pulses it generates a 0.5 microsecond END OF LP SYNC pulse which is applied to line 266 to prevent change of state of HP/LP FR FF 242 and thus prevent interruption of the LP signal processing during the latter part of each LP SYNC pulse. In response to an HP SYNC pulse, it puts out an Advance pulse 1.5 microseconds after the last-previous Advance pulse, and in response to each data pulse it produces an Advance pulse either 1 or 0.5 microseconds after the preceding pulse depending on the data content. Such a transition timer which in essence merely puts out a pulse delayed by one of four possible delays, depending on the input signal supplied to it, can take any of a large variety of forms which will occur to one skilled in the art, in view of the present disclosure. Accordingly, no further more detailed disclosure thereof is set forth herein.

As examples only, one can use shift registers, tapped delay lines or counters for such purposes. It is presently preferred to use for this purpose a ripple counter, since it is readily implemented on a custom integrated circuit chip.

The input transition timer 303 of FIG. 9 responds to the received NRZD signal on line 300 to produce the four output signals on output lines 304, 306, 308 and 310 described above with reference to FIG. 9. Again, this function also can be implemented in many different ways. It is presently preferred to use a transition detector which puts out a pulse (transition clock) each time the input signal executes a transition in either direction and then measures the time between transitions to put out an HP SYNC pulse, an LP SYNC pulse, a data High level or a data Low level, depending on the measured time between transition pulses. In order to accommodate distortion along the signal path between MUX and DEMUX, allowance is preferably made for some variation from ideal in the time between transitions. Thus a 1 is detected for an inter-transition time interval anywhere between $\frac{1}{4}$ and $\frac{3}{4}$ microseconds, a 0 for a time interval between $\frac{3}{4}$ and $1\frac{1}{4}$ microseconds, an HP SYNC for a time interval between $1\frac{1}{4}$ and $1\frac{3}{4}$ microseconds, and an LP SYNC for a time interval between $1\frac{3}{4}$ and $2\frac{1}{4}$ microseconds. Further, in order to minimize false triggering on electrical noise signals, a blanking pulse suppressing all received signals for $\frac{1}{4}$ microsecond following each valid received pulse is preferably used; moreover, a time-out Error signal is preferably generated and may be used to produce a display indication whenever a transition is not detected within 2.25 microseconds after a valid transition pulse. Since the master oscillator 301 preferably operates at 8 MHz and all timing is accurate to within one-half cycle of the local clock signal controlled by the oscillator, the time intervals mentioned above are typically accurate to within about ±31.25 nanoseconds.

One simple way in which the time between transitions can be measured is to use each transition pulse as a reference pulse to generate five different gate pulses, each starting progressively longer after the reference pulse and each lasting throughout the maximum frame time. The five gate pulses may be applied to respective different gate devices and the transition pulses applied to all five gates in parallel. A following transition pulse corresponding to the half-microsecond interval representing a 1 will pass through only the first gate, a transition pulse corresponding to a 0 will pass through only the first and second gates; a transition pulse corresponding to an HP sync pulse will pass through only the first three gates, and a transition pulse corresponding to an LP sync pulse will pass through only the first four of the gates. A pulse passing through all five gates will indicate an error, since it is beyond the maximum expected delay for a valid pulse. A simple logic circuit can then detect the delay of each transition pulse compared to the preceding transition pulse by sensing whether outputs are obtained from 1, 2, 3 or 4 of the gates, and an error can be detected by sensing outputs from all five gates.

However, it is presently preferred to use the type of input transition timer shown in FIG. 14, the operation of which is represented by the graphs of FIG. 15.

Referring to the latter figures, the NRZD input line 300, the timing clock oscillator 301, and the output lines 304, 306, 308 and 310 for the HP SYNC, LP SYNC, Transition Clock and Data 1/0, respectively, are as shown in FIG. 9; the remainder of FIG. 15 shows functionally one form of electronics preferably used inside the input transition timer 303.

In this form of the system, the input NRZD signal is applied to the edge detector 700, which also receives clock pulses from clock oscillator 301. It will be recalled that the data input signal to the edge detector is preferably bipolar in the sense that the signals on the two wires of the twisted-pair line are the same but of opposite polarities. Accordingly the edge detector, which may be conventional, preferably includes two edge-detecting flip-flops, one for each wire, and an inverter through which the signal from one of the wires is passed prior to its application to its edge-detecting flip-flop. The outputs of the two edge-detecting flip-flops may then be combined by applying them to the two input terminals of an OR gate, the output of the OR gate constituting the edge or transition pulses on line 702 which are applied to timing generator 704. One such edge pulse is produced for each positive or negative going transition in level of the received signal. Timing generator 704 responds to each such edge pulse to produce a series of three successive timing pulses ET1, ET2 and ET3.

Referring to FIG. 15, at A there is shown the NRZD signal on input lead 301, including a reference edge and four successive edges following the reference edge by time intervals representing a 1, a 0, an HP SYNC pulse and an LP SYNC pulse. The other graphs of FIG. 15 are shown as they would exist if no succeeding edge were received. It will be understood that when a succeeding edge corresponding to a 1, a 0, an HP SYNC pulse or an LP SYNC pulse is received, the various graphs of FIG. 15 will revert promptly to the values shown for the reference pulse.

FIG. 15B shows the 8 MHz clock pulses from oscillator 301 on the line marked "OSC (8 MHz)".

At FIG. 15C there is identified by the diagonal hatching the oscillator cycle during which the reference transition occurs. It is at the first upward-going edge of the clock pulse following the reference edge pulse that the first timing pulse ET1 is initiated, as shown at FIG. 15E. At FIG. 15D is shown an edge-detector inhibit pulse by which the edge-detector is preferably prevented from responding to received information for about 3/16 microsecond after the reference transition, to minimize interference from electrical noise at such times.

As shown at FIG. 15E, ET1 has a duration of ⅛ microsecond, and at its end the ET2 pulse is initiated by the timing generator, as shown at FIG. 15F. The ET2 pulse lasts for 1/16 microsecond, and at its end the ET3 pulses are initiated by the timing generator, as shown at FIG. 15G. The ET2 pulse is applied over line 720 to reset the edge detector promptly, preparing it to detect the next transition or pulse edge, and is also supplied through AND gate 722 to serve as the transition clock pulse on line 308 as described later herein.

The ET3 pulses are applied to the reset terminals of duration counter 726 and of decode flip-flops 728, over line 739; each of the latter devices operates continuously, and is reset upon the occurrence of each ET3 pulse.

Counter 726 of FIG. 14 may constitute a chain of three individual counters producing respective outputs DC0, DC1 and DC2 as shown in FIGS. 15H, I and J respectively. The DC0 constitutes a Low level initiated at the leading edge of the ET3 pulse and lasting ¼ microsecond followed by a High level which lasts for ¼ microsecond; this alternating of levels repeats until a subsequent edge pulse occurs. As in others of the graphs, a double level indicates that the signal may have either level at such times.

As shown in FIG. 15I, the first DC1 High level is also initiated at the leading edge of the ET3 pulse, and terminates after ½ microsecond; it then assumes its Low level for ¼ microsecond, and this alternation of levels continues until the next edge pulse occurs.

As shown at FIG. 15J, the DC2 signal assumes a Low level at the beginning of the ET3 pulse, returns to its High level after ½ microsecond, and remains in its High state for ⅛ microsecond. Accordingly, it constitutes a square wave with a ¼ microsecond periodicity.

The decode flip-flops 728 produce four outputs designated 2T, 3T, 4T and 5T on lines 732, 734, 736 and 738 respectively.

As shown at FIG. 15K, the 2T signal goes Low at the beginning of the first ET1 pulse, stays Low for ½ microsecond, and then returns to its High state; it remains in its High state until the next transition occurs.

The 3T signal shown at FIG. 15L goes Low at the end of the ET3 pulse, remains Low for 1 microsecond, and then returns to its High Level; it then remains High until the next transition pulse.

The 4T signal shown at FIG. 15M goes Low at the beginning of ET3 and remains Low for 1½ microseconds, after which it returns to its High level where it stays until the next transition pulse.

The 5T "Timeout Error" signal shown at FIG. 15N assumes a constant Low level at the beginning of ET3 and stays at this level for 2 microseconds. If there is no subsequent transition pulse until after this time, the 5T signal produces a High, indicating a malfunction. This signal may be used to change the condition of illumination of a warning light, for example, when an error is thus detected.

It is also noted that, at the end of the ET2 pulse, the phase of the clock pulse timer is shifted by one-half cycle so that its rising edge is substantially coincident with the rising edge of the ET3 pulse. This is to assure that the timing discussed above will be obtained, in proper relation to the clock pulses, and is accomplished by the oscillator phase control 730 in response to the ET2 pulse supplied to it over line 731.

In operation, following each transition in the received pulses the duration counter and the decode flip-flops are reset and the timing generator started. Initially, 2T holds the data line 732 High, indicating a 1, and the 3T and 4T signals hold the HP SYNC and LP SYNC lines 736 and 734 also High. As the duration counter counts upwardly, the Inhibit level is removed so that the next transition can be detected; next, the data line 732 (see 2T) goes Low for ½ microsecond, as shown in FIG. 15; if the next edge pulse occurs during this interval (as does the "1" edge signal shown in FIG. 15A), then a 1 is indicated on the output line 310 of flip-flop 800 upon the occurrence of the next transition clock pulse on line 721, and the system is reset. If instead such next edge pulse following the reference edge pulse occurs in the next subsequent half-microsecond (as does the "0" edge interval in FIG. 15A), the 2T output on line 732 will have become High and flip-flop 800 will indicate a 0 on its output line 310 upon the occurrence of the next transition clock pulse.

If instead the next transition pulse following the reference pulse occurs in the second-subsequent ½ microsecond interval corresponding to the HP SYNC interval in FIG. 15A, the 3T signal on line 734 will have become High while the 4T level on line 736 remains Low, as shown in FIG. 15; the 4T level is passed through the inverter 820 so that it is presented as a High to AND gate 822, the other 3T input to which, delivered over line 830, is also High. Accordingly, upon the occurrence of a subsequent transition pulse in the 1¼ to 1¾ range of received pulse widths, flip-flop 832 is set, and reset shortly thereafter by the ET3 level on line 834, to form on line 304 the pulse designated as HP SYNC.

If instead the first edge pulse following the reference edge pulse occurs in the delay interval 1¾ to 2¼ microseconds, the 3T level will have become High but the 4T level will be Low, as shown. The Low level of 3T serves to block AND gate 822, so that the HP SYNC pulse is not produced, while the High level of the 4T signal is supplied over line 840 to set flip-flop 842; resetting of flip-flop 842 by the ET3 signal on line 834 then produces the desired LP SYNC pulse on line 306.

FIG. 15 O shows the successive "windows" for reseption of the edge pulses, while FIG. 15P shows the time durations of these windows.

It is noted that the transition pulse on line 720A is passed through an AND gate 722, the other input to which is supplied over line 910 from NOR gate 912.

The NOR gate inputs are supplied by the 3T and 4T outputs of the Decode Flip-Flop 728, and when both of the latter signals are Low the NOR gate output is High and AND gate 722 transmits the transition clock pulse during the initial 1¾ microseconds interval following the reference pulse, during which it is receptive to 1 or 0 data pulses; for reception of the later sync-edge pulses, the NOR gate is blocked by the occurrence of a High 3T or 4T level which prevents registering of 1 and 0 signals at such times, as desired.

For simplicity and clarity of exposition of the general operation of the preferred input transition, FIG. 15 shows the leading edge of the ET1 pulse as substantially coincident with the change in state of the "T" decode flip-flops, with the changes in state of the decode flip-flops and with the limits of the "windows" shown at FIG. 15P which define whether the edge pulse is interpreted as a 1, a 0, an HP SYNC or an LP SYNC pulse. Accordingly, it may not be entirely clear whether a correct interpretation will be made of an edge pulse which occurs very close to an extreme of one of those windows.

In actuality, various of the last-described signals are caused by others of the signals, and hence they are not all exactly coincident in time. More particularly, the leading edge of the ET1 pulse is applied to sense the states of the flip-flops 800, 832 and 842 which define the extremes of the "windows"; the changes in state of these decode or T flip-flops are actually caused by changes in state in the duration counter 726. Since the resultant delay between the rising edges of the clock pulses applied to count the duration counter and the occurrence of the resultant changes in the states of the "T" flip-flops is greater than the delay between the clock pulses and the leading edges of the ET1 pulses which strobe the Data, HP SYNC and LP SYNC flip-flops, the edge pulses will cause reading of the latter flip-flops while they still retain the appropriate states to produce a proper interpretation of the transition or edge.

There are many other conventional arrangements for accomplishing the same purpose of forming a pulse of a particular polarity on a particular one of several lines depending on the delay of an input pulse with respect to a reference pulse.

While in the example shown in the drawings the portion of the plug assembly which contains the multiplexing and demultiplexing circuitry and the portions which connect to the cable and to the power supply are provided with separate plugs which plug into each other, in some cases the cable and/or the power supply may be permanently wired to the circuitry-containing portion of the assembly to form an integral cable-assembly unit.

Accordingly, there had been provided a system in which parallel information on a first group of connector elements is conveyed to a second corresponding group of connector elements by means of a cable having a connector plug assembly at each end for making plug-in connection to said first and second groups of connector elements, while using for this purpose a number of conductors in the cable which is small compared with the number of connector elements in each of said connector plug assemblies.

Thus although the invention has been described with respect to specific embodiments in the interest of complete definiteness, it will be understood that it may be embodied in a variety of forms differing substantially from those shown and described, without departing from the spirit and scope of the invention as defined by the appended claims.

What is claimed is:

1. In a cable system for transferring information contained in a group of original separate parallel signals in the RS232 type of format from a first set of connector elements of a first RS232 type of interface to a second set of connector elements of a second RS232 type of interface in the same format, said group comprising data signals and a plurality of other associated timing and control signals on different ones of said first set of connector elements of siad first RS232 type of interface, said system comprising a first quick-disconnect connector plug assembly including a third set of connector elements carried thereby and matable with said first set of connector elements in quick-disconnect fashion; a second quick-disconnect connector plug assembly including a fourth set of connector elements carried thereby and matable with said second set of connector elements in quick-disconnect fashion; and a signal transmission cable interconnecting said first and second plug assemblies, the improvement wherein:

(a) said first quick-disconnect plug assembly contains parallel-to-serial converter means responsive to said group of original separate parallel signals on said third set of connector elements when mated with said first set of connector elements for sampling them successively to convert them to a serial signal and for applying said serial signal to one end of said cable for transmission to said second plug assembly; and (b) said second quick-disconnect plug assembly contains serial-to-parallel converter means responsive to said serial signal at the other end of said cable for converting it to reconstituted separate parallel signals substantially identical to said original separate parallel signals and for applying said reconstituted parallel signals separately to respective ones of said connector elements of said fourth set in said RS232 format.

2. The system of claim 1, wherein said second quick-disconnect plug assembly also contains parallel-to-serial converter means responsive to separate parallel signals in the RS232 type of format on said fourth set of connector elements for sampling them successively to convert them to a serial signal and for applying said last-named serial signal to said other end of said cable; and wherein said first quick-disconnect plug assembly contains serial-to-parallel converter means responsive to said last-named serial signal at said one end of said cable for converting it to reconstituted separated parallel signals in the RS232 type of format substantially identical to said separate parallel signals on said fourth set of connector elements and for applying said last-named reconstituted signals separately to respective ones of said connector elements of said third set.

3. The system of claim 1, comprising power supply means connected to said cable system for providing electrical supply power to operate said parallel-to-serial and serial-to-parallel converters.

4. The system of claim 3, wherein said power supply means are exterior to said first and second quick-disconnect plug assmeblies and comprise two power supplies, one comprising a first rectifier circuit and a first ac line cord adjacent said first plug assembly, and the other comprising a second rectifier circuit and a second ac line cord adjacent said second plug assembly.

5. The system of claim 1, wherein said cable system comprises a twisted-pair line for transferring said serial signals from said first plug assembly to said second plug assembly.

6. The system of claim 2, wherein said cable comprises two twisted-pair lines for transferring said serial signals between said plug assemblies in both directions.

7. The system of claim 6, wherein said cable system also comprises wires for delivering said supply power from each of said rectifier circuits to its adjacent plug assembly.

8. In a system for transferring binary digital information in parallel form between a first RS232 type of interface on a first electrical apparatus and a second RS232 type of interface and a second electrical apparatus in both directions by way of a cable system, said cable system having a first plug assembly connected to one of its ends and a second plug assembly connected to its other end, said information at both of said RS232 types of interfaces being in the RS232 type of format comprising a data signal and a plurality of other separate parallel timing and control signals, the improvement wherein:

(a) each of said plug assemblies contains a parallel-to-serial converter for sampling successively the data signal and the plurality of other separate parallel timing and control signals supplied thereto from one of said interfaces apparatuses and for converting them to a serial signal, and each contains a serial-to-parallel converter responsive to the serial signal reaching it over said cable for converting it to reconstituted separate parallel signals substantially the same as those from which the serial signal supplied to it was derived;

(b) said cable comprises means for transferring serial signals from the parallel-to-serial converter in said first plug assembly to said serial-to-parallel converter in said second plug assembly, and also comprises means for transferring serial signals from said parallel-to-serial converter of said second plug assembly to said serial-to-parallel converter of said first plug assembly, whereby separate prallel signals in the RS232 type of format applied to either of said plug assemblies from either of said first and second electrical apparatuses are converted to serial form, transferred by said cable to the other plug assembly, and then reconstituted as parallel signals.

9. The system of claim 8, comprising means for delivering operating supply power to each of said serial-to-parallel and parallel-to-serial converters.

* * * * *